P. H. SKAVLEN.
WHIFFLETREE HOOK.
APPLICATION FILED MAY 4, 1909.
948,527.
Patented Feb. 8, 1910.
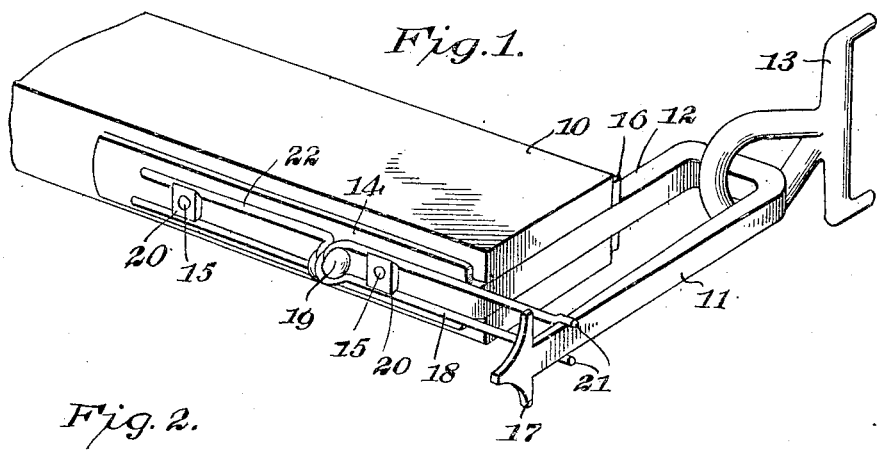
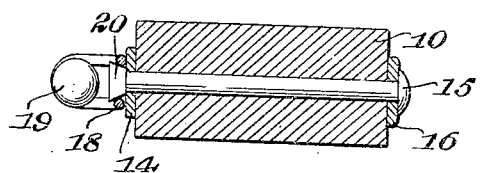
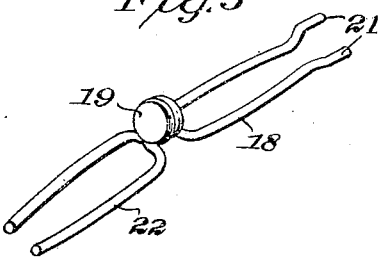
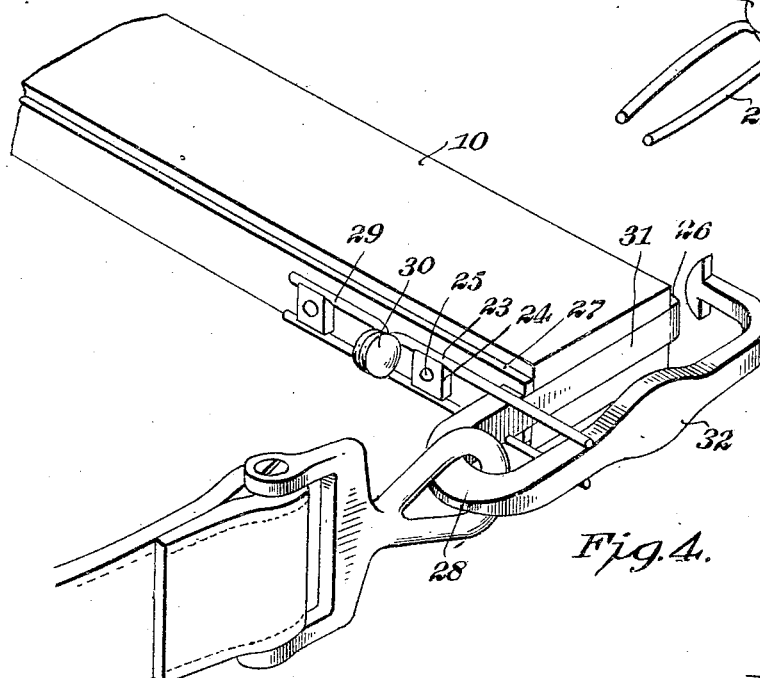
Witnesses
W. N. Woodson
Cora N. Handy
Inventor
P. H. Skavlen,
By
[signature], Attorneys

UNITED STATES PATENT OFFICE.

PETER H. SKAVLEN, OF CEDAR VALE, KANSAS.

WHIFFLETREE-HOOK.

948,527.  Specification of Letters Patent.  Patented Feb. 8, 1910.

Application filed May 4, 1909. Serial No. 493,834.

*To all whom it may concern:*

Be it known that I, PETER H. SKAVLEN, citizen of the United States, residing at Cedar Vale, in the county of Chautauqua and State of Kansas, have invented certain new and useful Improvements in Whiffletree-Hooks, of which the following is a specification.

This invention relates to whiffletrees and refers particularly to a hook which is adapted to be carried by the same and which detachably supports the tugs carried upon the ends of the traces.

An object of this invention is to construct a hook which will retain the tugs from accidental displacement and at the same time will admit of the quick detachment of the same from the hook when such is desired.

The invention further contemplates the provision of a hook of this character which is provided with means by which the hook is retained in position upon the end of the whiffletree and such means being also employed for locking the tug in position.

The invention has for a still further object the provision of a hook of this character which comprises but few parts and which embodies such arrangement of the parts that the same may be economically produced and be strong and durable so as to embody a practical and efficient device.

For a full understanding of the invention reference is to be had to the following description and accompanying drawings, in which :—

Figure 1 is a perspective view of the hook and improved fastening means applied thereto as supported upon the extremity of a whiffletree. Fig. 2 is a transverse section through the end of the whiffletree having the fastening means supported thereon. Fig. 3 is a perspective view of the fastener detached. Fig. 4 is a perspective view of a modification of the hook and fastening means.

Corresponding and like parts are referred to in the following description and indicated in all the views of the drawing by the same reference characters.

Referring to the drawing the numeral 10 designates the end of a whiffletree upon which the hook is to be secured, the hook being formed of a length of metal which is bent substantially U shape to form the arms 11 and 12 between which the tug 13 is engaged and retained by the improved device which will be hereinafter described. The inner arm 12 is provided with an outwardly curved support 14 which engages upon one side of the whiffletree 10 and is secured thereto by the employment of bolts 15 which are positioned at intervals throughout the length of the support 14 and through the whiffletree 10. The arm 12 is provided intermediately with a brace 16 which is registered with the opposite side of the whiffletree 10 and which is apertured for the reception of the headed ends of the bolts 15 which are passed through the whiffletree 10 and support 14. The outer arm 11 of the hook is extended slightly beyond the extremity of the arm 14 and is provided with laterally projected lugs 17 which are adapted for engagement with the tugs 13 to render the removal of the same difficult by the jarring thereof should the fastening device be left unlocked.

The means employed for fastening the tug 13 upon the hook comprises a length of spring wire 18 which is bent substantially U shape and provided with a plurality of helices intermediately thereof which are turned in a plane at right angles to the arms of the wire 18 and through which is passed a rivet 19. The bolts 15 are provided upon their threaded extremities, the same extending through the support 14, with nuts 20 which are inwardly beveled at their opposite faces to admit of the engagement of the arms of the wire 18 thereagainst in order to retain the same against the face of the support 14 and in sliding engagement therewith. The wire 18 is offset outwardly at its outer ends as at 21 in order to form shoulders for engagement against the inner opposite edges of the arm 11 in juxtaposition to the lugs 17 in order to form a rigid fastening means to retain the tug 13 upon the hook. A second length of wire 22 is provided which is in like manner bent into U-formation and provided with a number of helices at its central portion which are engaged about the rivet 19 so as to move the wire 22 simultaneously with the wire 18 and to form a guide for retaining the wire 18 in position. The wire 22 is engaged beneath the beveled edges of a nut 20 which is carried upon the threaded extremity of the adjacent bolt 15.

In the modification which is disclosed in the drawing the fastening means comprises a length of wire 23 which is engaged beneath the beveled edges of a nut 24 carried upon the threaded extremity of a bolt 25 which is positioned through the whiffletree 10 and engaged from the support 26 through the whiffletree and terminated in the outer face of the brace 27. This arrangement of the bolts 25 positions the length of wire 23 at the inner end of the U-shaped hook and disposes the same a distance from the cross-arm 28 of the same. The length of wire 23 is provided with a second length of wire 29 which is bent U-shaped and provided intermediately with helices, the helices of the wires 23 and 29 being secured together by the employment of a rivet 30 which causes the simultaneous operation of the two wires. The outer extremities of the wire 23 engage against the opposite sides of the inner arm 31 of the hook and move outwardly thereof and engage against the opposite sides of the outer arm 32 when the same is secured in a locked position.

The wires employed for locking the hook 13 in position are all bowed at their inner ends in order to tensionally retain the same outwardly upon the nuts 20 and thereby form a secure fastening means for retaining the tug 13 upon the hook.

In conjunction with the securing of the tug 13 upon the hook the wires 18 and 22 are also employed as lock nuts in order to prevent the rotation of the nuts 20 from the bolts 15 and to thereby retain the hook rigidly upon the whiffletree 10.

The operation of the device is apparent as the outer extremities of the spring arms of the wires 18 and 22 frictionally engage the opposite sides of the nuts 20 and thereby retain the wires 18 and 22 rigidly in any position in which the same are adjusted. However, owing to the bowed inner portions of the arms of the wires, the same have a tendency to remain in an outer or closed position as the extremities of the wires are converged and hence the greatest tension is had at such extremities. When the tug 13 is to be secured to the hook the operator grasps the rivet 19 and withdraws the same from the end of the whiffletree 10 retracting the offset portions 21 from the arm 11. The hook 13 is now engaged over the arm 11 and carried inwardly upon the hook when the operator returns the rivet 19 and moves the offset portions 21 outwardly against the opposite edges of the outer arm 11, the offset portions 21 being secured against the lug 17 whereby any movement for removing the tug 13 from the hook is arrested by the engagement of the offset portions 21 against the lugs.

Having thus described the invention what is claimed as new is:—

1. A device as specified comprising a U-shaped hook disposed upon the end of a whiffletree, a support outwardly extended from one arm of said hook and engaged against the whiffletree, a brace outwardly extended in parallel to said support from an intermediate portion of said arm for engagement against the opposite side of said whiffletree, bolts engaged through said whiffletree and terminated in said support, nuts engaged over said bolts and having beveled opposite faces, a length of wire bent substantially U-shaped and engaged against the opposite faces of said nuts and lugs projected upon the edges of the outer arm of said hook for retaining the outer ends of said length of wire upon the locking of the same.

2. A device as specified comprising a U-shaped hook disposed upon the end of a whiffletree, bolts engaged through the whiffletree to support said hook, nuts carried upon the bolts and having oppositely beveled edges, U-shaped spring members disposed over said nuts and slidably engaged with the beveled edges thereof, helices formed upon the inner ends of said spring members, a rivet engaged through the helices to secure said spring members together and to form a handle to slidably actuate the same and lugs extended edgewise from the outer arm of said hook to coöperate with the outer extremities of the adjacent spring member when the same is in a locked position.

3. In a whiffletree hook the combination with a whiffletree of a U-shaped hook carried by said whiffletree, spring arms carried by said whiffletree for engagement against the opposite sides of said hook, bolts engaged through said hook and said whiffletree to secure said hook in position and nuts having oppositely beveled edges engaged over said bolts between said spring arms for preventing the rotation of said nuts and to form a support for said spring arms.

4. A device as specified including a U-shaped hook mounted upon the end of a whiffletree, a pair of spring arms carried by the whiffletree to engage across said hook and resiliently clasp the sides of the outer arm thereof and lugs oppositely extended from the outer end of said outer arm to retain said spring arms in position.

5. A device as specified including a U-shaped hook carried upon a whiffletree, and a pair of spring arms slidably mounted upon one edge of the whiffletree for engagement across the arms of said hook and to abut against the sides of the outer of said arms.

6. A device as specified comprising a U-shaped hook carried upon the end of a whiffletree, a pair of spring arms slidably mounted on one edge of the whiffletree for engagement across the extremities of the arms of said hook and shoulders formed oppositely upon said arms to engage against the opposite edges of the outer of said arms.

In testimony whereof I affix my signature in presence of two witnesses.

PETER H. SKAVLEN. [L. S.]

Witnesses:
A. L. KING,
J. A. GLASSCOCK.